April 23, 1957 E. BOBARD 2,789,646
FRONT WHEEL DRIVE CONNECTION RESPONSIVE TO FASTEST
OF THE DIFFERENTIALLY DRIVEN REAR WHEELS
Filed Jan. 15, 1954 4 Sheets-Sheet 1

Inventor:
Emile Bobard,
By: Howson and Howson,
Attorneys

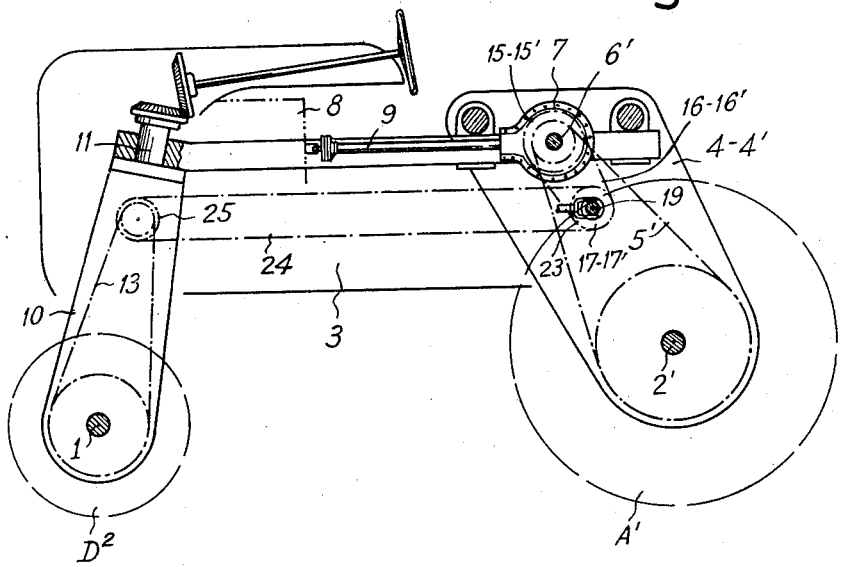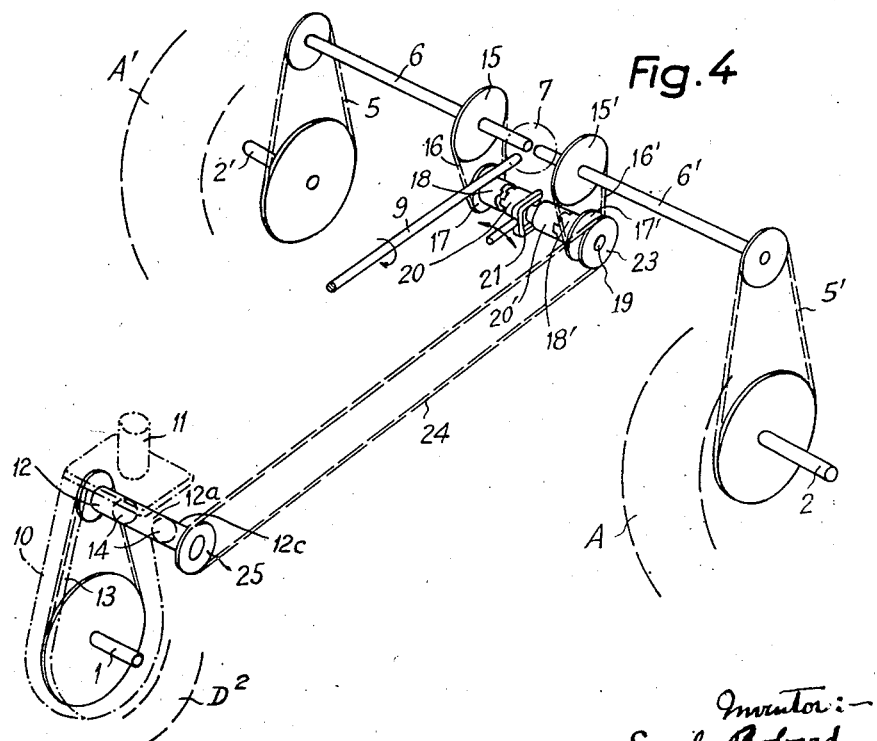

April 23, 1957   E. BOBARD   2,789,646
FRONT WHEEL DRIVE CONNECTION RESPONSIVE TO FASTEST
OF THE DIFFERENTIALLY DRIVEN REAR WHEELS
Filed Jan. 15, 1954   4 Sheets-Sheet 4

Inventor:
Emile Bobard
By: Howson and Howson,
Attorneys

United States Patent Office 2,789,646
Patented Apr. 23, 1957

2,789,646
FRONT WHEEL DRIVE CONNECTION RESPONSIVE TO FASTEST OF THE DIFFERENTIALLY DRIVEN REAR WHEELS

Emile Bobard, Beaune, France

Application January 15, 1954, Serial No. 404,179

Claims priority, application France September 2, 1953

16 Claims. (Cl. 180—6.26)

This invention relates to drive systems for motor vehicles, more particularly for vehicles of the type having a pair of rear wheels power driven through a differential device, and one or more front wheels which are both power driven to cooperate with the rear wheels in propelling the vehicle, and are steerable for steering the vehicle. The invention has particular but by no means exclusive utility as applied to tractors of the type used to draw farming machines and the like.

It is an object of the invention to provide a motor vehicle, particularly a tractor, which has improved performance characteristics over known vehicles of comparable type. Another object is to improve the performance of such a vehicle during turns. A further object is to minimize or prevent skidding of such a vehicle during turns. A further object is to improve the coordination between front and rear wheels in a vehicle provided with an all-wheel drive, particularly during a turn. A specific object is to cause the front wheel or wheels of such a vehicle to be positively driven, during a turn, at an angular speed corresponding to the angular speed of that one of the rear wheels which is outermost with respect to the turn, regardless of the direction in which the turn is made and regardless of whether the vehicle is moving forwards or backwards.

The above and further objects of the invention, as well as the characteristic features and advantages thereof, will be fully apparent from a perusal of the ensuing description which discloses by way of illustration but not of limitation a preferred embodiment of the invention as well as some modifications thereof, with reference to the accompanying diagrammatic drawings, wherein:

Fig. 3 is a diagrammatic view in elevation of a tractor provided with one simple form of improved drive according to the invention;

Fig. 4 is a fragmentary view of the vehicle shown in Fig. 3, in isometric showing, to illustrate the main components of the improved drive;

Figure 1:
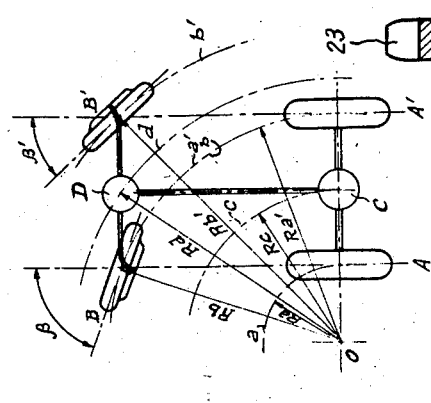
Fig. 1 is a simplified diagram illustrating the utility of the invention in the case of a vehicle having a pair of rear wheels and a pair of front wheels.

As shown in the diagram of Fig. 1, a vehicle of the type described is illustrated during a turn. The vehicle includes a pair of rear wheels A and A' driven from a differential C and a pair of front wheels B and B' driven from a differential D. As shown, the differential D and the front wheels B, B' describe circumferential paths $d$, $b$, $b'$, having a common center O and the respective radii $R_d$, $R_b$, $R_{b'}$, while the rear wheels A, A' and rear differential C describe concentrical paths $c$, $a$, $a'$, having radii $R_c$, $R_a$, $R_{a'}$, respectively smaller than the corresponding radii of the paths described by the rear differential and rear wheels.

As a result, if the input shaft to the front differential D and the input shaft to the rear differential C are driven at a common velocity it is evident that there would necessarily occur a difference between the tangential speeds of the front wheel with respect to the tangential speed of the rear wheels, proportional to the length of the path they follow, said difference corresponding in turn substantially to the ratio of the radii described by the rear differential C and the front differential D respectively (Fig. 1).

Such a difference will have as a result a slippage all the greater as the steering angles $\beta$ and $\beta'$ of the wheels B—B' are the greater and render the devices for driving front and rear differentials at the same speed inoperable for vehicles such as agricultural tractors in which the steering angle of the steering wheels is very large, especially in case of a vehicle having a single front driving and steering wheel $D^2$ (Fig. 3), in such a case, the rear wheel A would pivot about a fixed point, while said front wheel D would be positively driven at the same speed as the rear differential.

Figure 2:
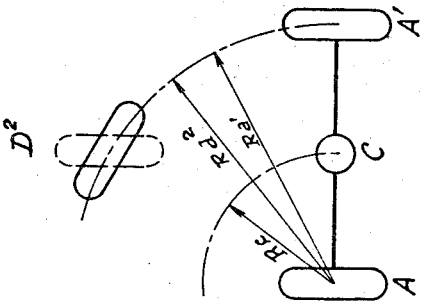
Fig. 2 is a similar diagram relating to the case of a vehicle having a pair of rear wheels and a single front wheel.

Figs. 1 and 2 further demonstrate that the forward differential D (Fig. 1) or the single front wheel $D^2$ (Fig. 2) as the case may be, follow arcuate paths substantially equal in radius to the path followed by the outer rear wheel A'.

According to the invention, therefore, the forward differential D (Fig. 1) or front wheel $D^2$ (Fig. 2) instead of being driven at the same velocity as the rear differential C, is driven at the same velocity as the rear wheel A' which occupies the outer position during the turn. The radii $R_{a'}$ and $R_d$ are, as a matter of fact, much closer to each other than the radii $R_c$ and $R_d$ (Fig. 1) and are even practically superposed in Fig. 2. For this purpose, the front differential or wheel D instead of being driven as in known systems through a common gear box likewise driving the rear differential C, is driven from that one of the rear wheels which is located outwardly during the turn, i. e. from wheel A or from wheel A' depending on the direction in which the turn is made.

While the change-over from the condition in which the front axle receives its drive from the left rear wheel to the condition in which the front axle receives its drive from the right rear wheel may be effected by actuation of a manual control, preferably such change-over is automatically performed through means whereby the drive is at all times taken from that one of the rear wheels which is rotating at the greater angular velocity. Such means may include two similar mechanisms one serving for forward drive and the other for reverse, and the appropriate one of said mechanisms being automatically made operative upon actuation of the reversing lever of the gear box.

As diagrammatically illustrated in Figs. 3 and 4, a farming tractor of generally conventional design has a frame 3, a front axle 1 mounting a single front wheel $D^2$, and rear axles 2 and 2' mounting the rear wheels A, A'. The rear axles 2 and 2' are supported at the lower ends of depending supports formed as casings 4 and 4' secured to the opposite sides of the chassis 3 near the rear end thereof and containing respective sprocket and sprocket chain drive mechanisms 5, 5', serving to transmit the power drive from the rear differential 7 which in turn is driven from the motor 8 through the drive shaft 9. Similarly the front axle 1 of wheel $D^2$ is journalled in the lower end of a support or casing 10 extending downwardly from the steering pivot 11 and containing a sprocket chain drive 13 for transmitting power from drive shaft 12 to front axle 1. In accordance with the conventional arrangement used in front wheel drive systems, the shaft 12 may comprise at least two parts. In the embodiment shown, the shaft has three parts 12a, 12b, 12c. The parts are preferably connected by a joint or swivel connection such as a Cardan joint 14, which permits movement of the shaft parts angularly with respect to one another.

The front drive shaft 12 instead of being driven directly from the motor is driven from either one of the differential output shafts 6 or 6' depending on the direction in which the vehicle is turning. For this purpose, the said output shafts 6 and 6' have sprocket pinions 15 and 15' secured thereon carrying sprocket chains 16 and 16' which have their lower ends trained about sprocket pinions 17 and 17'. The sprockets 17 and 17' are formed as integral units with respective clutch elements 18 and 18', said two units being each freely rotatable about a common shaft 19. This shaft further carries a movable clutch member comprising an integral pair of sets of clutch teeth 20 and 20' mounted for bodily sliding but nonrotational displacement with respect to the shaft 19. The clutch member 20, 20' is adapted to be moved axially of shaft 19 in either direction by a suitable control linkage diagrammatically indicated by the fork 21, in order to have either its set of clutch teeth 20 or 20', engage the corresponding set of teeth 18, 18'. The clutch control linkage including fork 21 is operable by the driver acting for this purpose on an appropriate control member arranged within convenient reach.

The shaft 19 has secured on it a sprocket gear 23 connected through a sprocket chain drive 24 with a sprocket 25 secured on the shaft 12. It will thus be seen that, depending on the position of the clutch fork 21 as manually selected by the driver of the vehicle, the front wheel D will be driven either off the right output shaft 6 or the left output shaft 6'.

It will be understood that the various drive ratios involved should be so selected that when steering a straight course, the tangential speed of wheel D will be the same as that of wheels A or A', regardless of whether the drive is picked off shaft 6 or shaft 6' through clutch member 20—20'.

Figure 5:
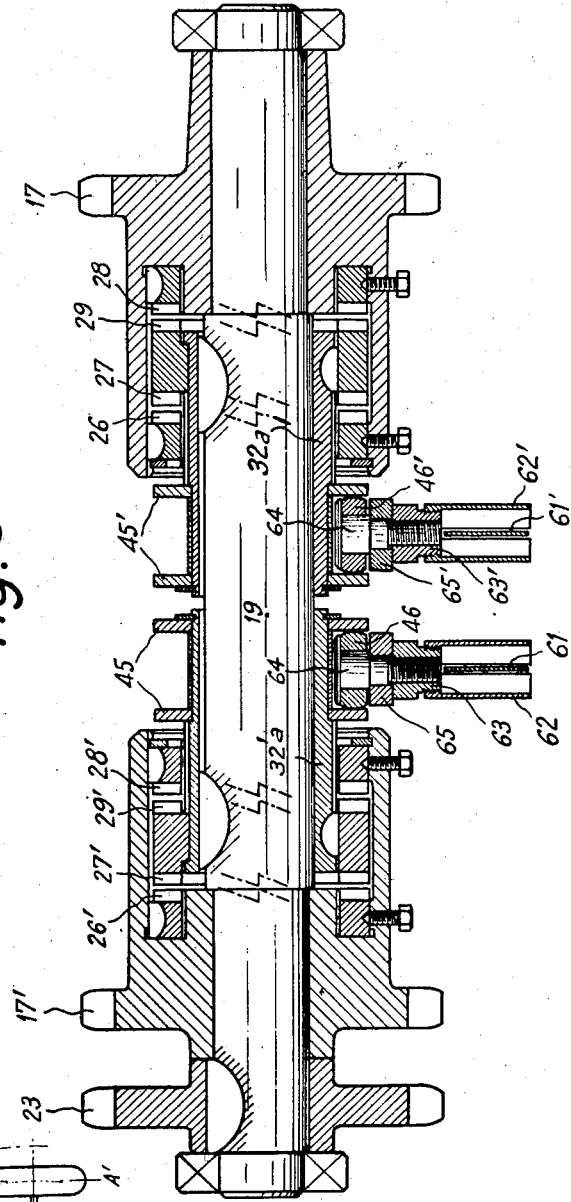
Fig. 5 is an axial section of a countershaft and selector assembly according to a more elaborate embodiment of the invention.

Fig. 5 illustrates one construction of an automatic selector arrangement whereby the sprocket 23 may be driven from one or the other of the output shafts 6, 6', of the rear differential 7, depending on the direction in which the vehicle is being turned, this being true both for forward drive and in reverse.

In Fig. 5, parts similar or corresponding to those described in connection with Figs. 3 and 4 have been designated by the same reference numbers. Thus 19 designates a countershaft having the sprocket gear 23 keyed thereon and having the two sprocket gears 17 and 17' rotatably journalled thereon, said gears 17 and 17' being respectively driven by two output shafts of the rear differential, such as shafts 6, 6' of Fig. 4. The differential with its output shafts have been omitted from Fig. 5. In the embodiment of the invention now described, the requisite selection is obtained by causing at any time the sprocket gear 23 to be driven from the particular one of sprocket gears 17 or 17', which is revolving at the higher velocity. In this way, the drive will be taken off the outermost wheel in a turn, both when the vehicle is being driven forward or in reverse. For this purpose, each of the cooperating clutch assemblies 18—20 and 18'—20' of Fig. 4, is replaced by a pair of overrunning clutch assemblies 26—27, 28—29 for one side, and 26'—27', 28'—29' for the other side.

The overrunning clutch assemblies 26—27 and 26'—27' are effective during forward driving, while the overrunning clutch assemblies 28—29 and 28'—29' are effective in reverse driving. It is noted that for greater clarity of the illustration all the clutch assemblies have been shown in their neutral or disengaged condition.

The clutch teeth 27—29 are formed on opposite sides of a clutch member 32a in the form of a sleeve and similarly clutch teeth 27'—29' are formed on opposite sides of a clutch sleeve 32'a, the sleeves 32a and 32'a being independently slidable axially of shaft 19. The sleeves are for this purpose formed with collar portions 45, 45' respectively engaged by rollers 46, 46' rotatably mounted on the ends of spindles 64, 64' and operable from a reverser lever 48 (Fig. 6) through a yielding transmission linkage to be described. The yielding transmission serves a dual purpose. First, it serves to displace the clutch sleeves as just stated in order selectively to engage the clutch teeth 26 with clutch teeth 27, and clutch teeth 26' with clutch teeth 27', during forward drive, or to engage clutch teeth 29 with teeth 28 and teeth 29' with teeth 28' during reverse drive of the vehicle. Secondly, regardless of the particular sets of clutch assemblies which are in engagement, said yielding transmission enables that particular set of clutch teeth which is associated with the sprocket gear 17 or 17' rotating at the lower angular rate, to overrun idly, whereby the shaft 19 will be automatically driven through the other set of clutch teeth, i. e. that which is associated with that one of gears 17 and 17' which rotates with the particular rear wheel of the vehicle having the greater angular velocity imparted to it at the time owing to the fact that it is the outermost wheel with respect to the turn being made.

Figure 6:
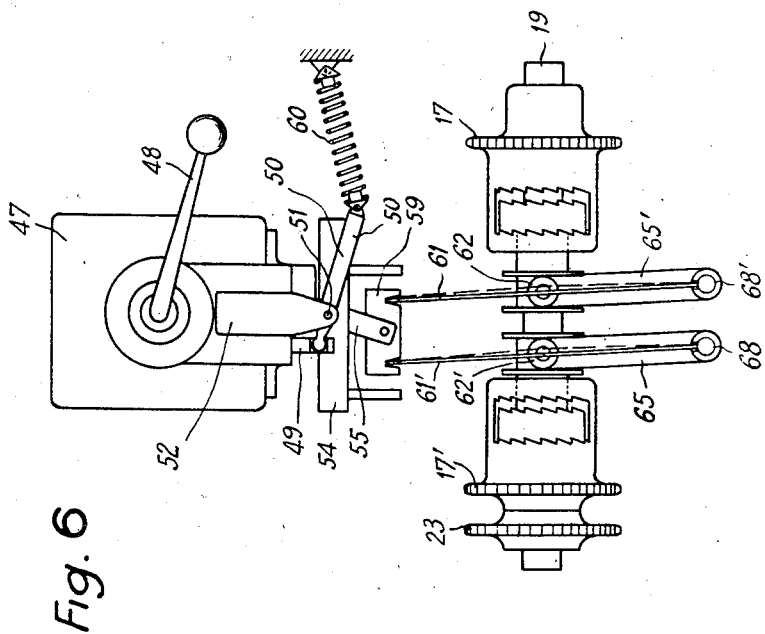
Fig. 6 is a simplified plan view of some cooperating components in the drive system according to the embodiment of Fig. 5, in the position assumed during forward driving.
Figure 9:
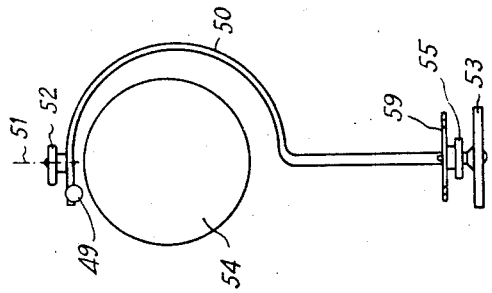
Fig. 9 is a sectional view on line IX—IX of Fig. 8.

The above mentioned yielding transmission may, as shown, be constructed as follows: The conventional slider assembly carrying the selector fork for the reverse drive pinions in the gear-box 47 (Fig. 6) of the vehicle is provided with an extension 49 with transversal grooves projecting out of the gear box. It will be understood that the slider assembly just mentioned may be of any conventional type and hence has not been illustrated herein. The extension 49 may occupy a retracted position as shown in Fig. 6 when the gear shift lever 48 is in its forward drive position, and said extension may be moved to the extended position shown in Fig. 7 when lever 48 is raised to place the vehicle in reverse gear. Extension 49 is formed with a slot, as illustrated, near its outer end. Positioned in this slot for swivel movement with respect to extension 49 is the ball-shaped end of a lever 50 pivoted about an axis 51. The lever 50 may conveniently be shaped as shown in Fig. 9, with an arcuate section in order to allow the path of movement of the lever to clear the differential coupling disc, diagrammatically outlined at 54, of differential 7. The lever 50 is mounted for rotation about the geometric axis 51 by means of a pair of journals, as diagrammatically shown in Fig. 9, one journal being attached to the gear box through a flange 52, while the other journal is carried by the plate 53 secured to the vehicle frame. The ball shaped end of lever 50 which is swivelled within the slot formed in extension 49, is here provided at the end of the semi-circular arcuate portion of the lever 50.

The opposite end of lever 50 has an arm 55 projecting therefrom at right angles to the plane of the semi-circular part of the lever. Pivoted to the lower end of arm 55 is a member 59 (Fig. 6) constrained to move in a horizontal plane by suitable guide means not shown. A tension spring 60 has one end attached to the outermost point of the semi-circular section of lever 50 and its other end anchored to a fixed part of the vehicle.

Figure 7:
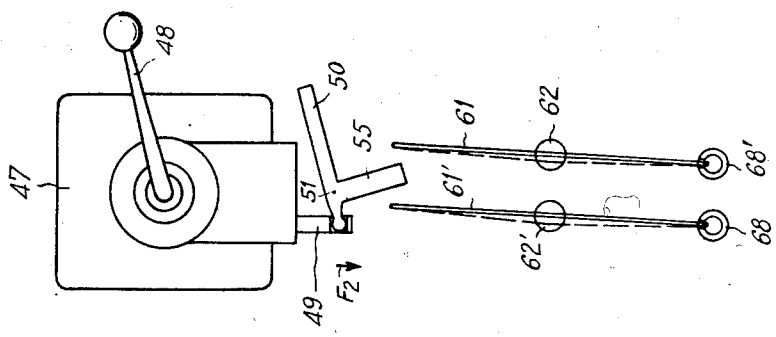
Fig. 7 is a view similar to Fig. 6, with some parts omitted, in the position assumed during reverse driving.

It will thus be apparent that according as the lever 48 is placed in its lower or upper position respectively corresponding to forward and reverse gear, the above described assembly of parts will assume either the position shown in Fig. 6 with lever arm 55 rocked leftwards and part 59 moved to the left, or the position shown in Fig. 7 wherein lever arm 55 is rocked to the right and the part 59 (not shown in that figure) moved likewise to the right. Spring-actuated lever 50 acts as a toggle link to hold the assembly securely in the position to which it has been moved.

Figure 8:
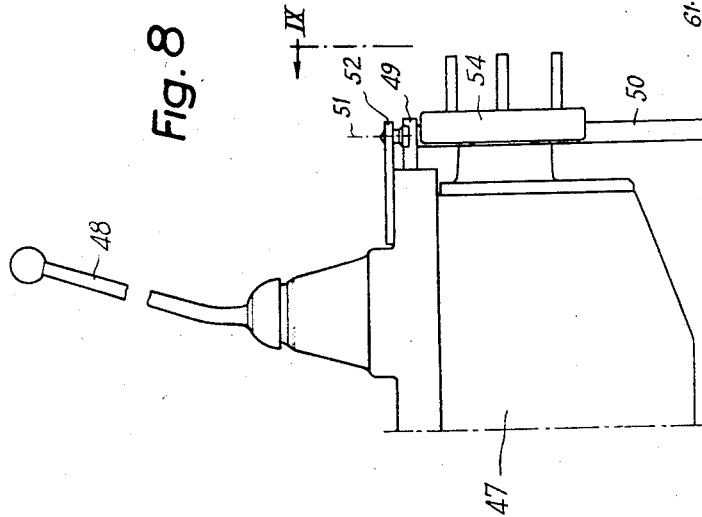
Fig. 8 is a view in elevation showing the parts in the same position as Fig. 6.

Upstanding from the rear of plate 53 (Fig. 8) is a pair of posts 66 spaced a distance corresponding to the spacing present between the rollers 46 and 46' when both clutch members 32a and 32'a are simultaneously moved fully to their right or left endmost position. A pair of lever arms 65 each have a sleeve portion projecting from one end thereof, said sleeve portions being rotatably journalled around the respective posts 66. Secured to the free ends of lever arms 65 by means of nuts 63 (Figs. 8 and 5) are the spindles 64, upon which the previously described rollers 64 are mounted.

As more clearly visible from Fig. 5, each nut 63 is formed with a downward axial extension which is externally threaded for rotatable connection therewith of the internally threaded upper end of a related sleeve member 62, 62'.

The sleeve members are formed with diametrically opposed slots extending along the greater part of their length. Extending through the slots in sleeves 62, 62' are a pair of resilient strips or arms 61, 61' having their one end fixedly engaged in a pair of slots (not shown) formed in the sleeve portions integral with the lever arms 65, mentioned previously, and their other ends fixedly engaged in a pair of slots formed in the displaceable part 59, as clearly shown in Fig. 6. The slots in each said pair are so spaced that, in the normal condition of the system, the resilient strips 61 and 61' extend in parallel planes.

The mechanism described operates as follows:

First considering the vehicle is being driven forward, the transmission mechanism is positioned, as already stated, as shown in Fig. 6. In this position, the clutch members 32a and 32'a are displaced to their leftward end position as shown in Fig. 5 or 6, so that clutch teeth 26 engage teeth 27, and teeth 26' engage teeth 27'. Both clutch members 32a and 32'a are constrained to rotate bodily with shaft 19. Assuming the vehicle enters into a turn, say a turn to the right, the right rear wheel will be rotating somewhat slower, and the left rear wheel will be rotating somewhat faster, than the front wheel of the vehicle. Hence gear 17 and clutch element 26 associated with the right wheel will be rotating somewhat slower than shaft 19 and clutch element 26, while gear 17' and clutch element 26' associated with the left rear wheel will be rotating somewhat faster than shaft 19 and clutch element 26'. As a result, the drive will be transmitted to shaft 19 only through clutch teeth 26'—27', that is from gear 17' and the left rear wheel, whereas the clutch teeth 27 will idly overrun the cooperating clutch teeth 26 without transmitting any torque. Such idle overrunning of the clutch teeth 27 is made possible owing to the yielding character of the connection including the resilient levers 61, 61'; in the exemplary instance just considered, the resilient lever 61 will flex as indicated by the broken lines in Fig. 6 each time a ridge of the clutch teeth 27 encounters a ridge of clutch teeth 26, thus allowing the roller 64 and clutch member 32a to yield in an axial direction along shaft 19, and permitting the desired overrunning action between clutch elements 26, 27 to be accomplished. In the case of a turn to the left during forward drive, the operation will of course be opposite, with the clutch teeth 26—27 transmitting the torque and the clutch teeth 26'—27' overrunning with respect to one another.

When the vehicle is to be driven in reverse gear, the driver operates lever 48 to its upward position shown in Fig. 7. The extension 49 then rocks arcuate lever 55 to the position shown, in which element 59 is brought to its rightward position adapted to cause clutch teeth 29 to engage with clutch teeth 28, and teeth 29' with teeth 28'. If the vehicle is now turned to the right, the drive will be transmitted through clutch teeth 29'—28' while clutch teeth 29—28 will assume an idle overrunning condition, whereas if the rearward turn is to the left, the reverse will be true. The overrunning of the clutches is again made possible by the yielding connection described, but in this case the resilient levers 61 or 61' will flex in the opposite direction from that which it assumed before, that is, it will flex as indicated by broken lines in Fig. 7.

Figure 10:
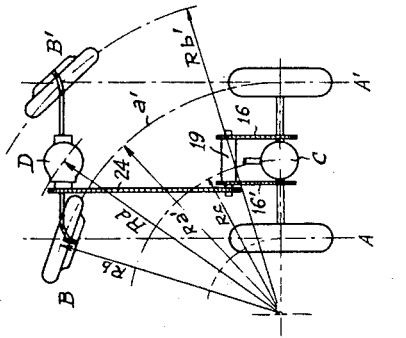
Fig. 10 is a diagrammatical illustration of the invention applied to a vehicle in the two front driving wheels.

The above described device relates more particularly to a vehicle having a single front driving wheel as illustrated on Figs. 3 and 4. In the case of a vehicle having two front driving wheels, as illustrated on Fig. 10, the same device may be used (chains 16—16', intermediate clutch shaft 19, chain 24) to ensure the driving of the front differential D through the semi-shaft of the rear differential C occupying an outer position in the turn.

In the case of a vehicle with two driving front wheels, the front differential D might in fact be omitted, as the front wheel B (Fig. 10) occupying an inner position in the turn, is driven directly through mere clutches by the rear wheel A' occupying an outer position in the turn.

It will be apparent to those familiar with the art that the details of structure described and illustrated may be modified in many ways within the scope of the invention. In particular the yielding connection between the clutch members 32a, 32'a and the actuating means therefor, such as the gear shift lever 48, may assume a variety of forms other than that disclosed. Moreover, the selection of the particular rear differential output shaft from which the drive is to be transmitted to the front wheels may be accomplished under control of the steering mechanism, through any suitable operative connection with the steering shaft.

What I claim is:

1. In a motor vehicle having a motor, rear wheels and a front wheel means, a rear differential having an input shaft driven from said motor and output shafts driving said rear wheels, a rotating member driving said front wheel means, and means for selectively establishing a drive connection from a selected one of said output shafts to said member.

2. In a vehicle having a motor, rear wheels and a front wheel, drive means for said front wheel a rear differential having an input shaft driven from said motor and a pair of output shafts respectively driving said rear wheels, and means for selectively establishing a drive connection from a selected one of said differential output shafts to the drive means for the aforesaid front wheel.

3. In a vehicle having a motor, rear wheels and front wheels, a rear differential having an input shaft driven from said motor and a pair of output shafts respectively driving said rear wheels, a forward differential having an input shaft and a pair of output shafts respectively driving said front wheels, and means for selectively establishing a drive connection from a selected one of said rear differential output shafts to said input shaft of the forward differential.

4. The combination claimed in claim 1, which includes a manual control member for operating said selective means.

5. In a vehicle, a motor, rear wheels and a front wheel means, a rear differential having an input shaft and output shafts respectively driving said rear wheels, a countershaft, a drive transmission from said countershaft to said front wheel means, a first and a second member rotatably mounted on said countershaft, drive transmissions to each one of said members from a related one of said output shafts, and a displaceable clutch means on said countershaft adapted in one position to connect one, and in another position to connect the other of said members for rotation with said countershaft, and means for selectively moving the clutch means to either position as said vehicle enters into a turn, whereby the front wheel means may be selectively driven from that one of said output shafts which is positioned outwardly of said turn.

6. In a vehicle, a motor, rear wheels and a front wheel means, a rear differential having an input shaft driven from said motor and output shafts driving the rear wheels, a rotatable element and a drive transmission therefrom to the front wheel means, and means associated with the rotatable element for sensing which one of said output shafts is rotating faster during a turn, and operative to connect the rotatable element for rotation with said faster output shaft.

7. In a vehicle, a motor, rear wheels driven from the motor and a front wheel means, rotatable steering means for displacing the front wheel means to steer the vehicle, and selective means operative on rotation of the steering means in either direction for establishing a drive connection from whichever is the fastest moving one of said rear wheels to the same front wheel means.

8. In a vehicle, as claimed in claim 1, an angularly displaceable steering member for displacing the front wheel means to steer the vehicle, said means for selectively establishing a drive connection being operable on angular displacement of the steering member to connect the said rotating member to the fastest moving one of the output shafts for rotation therefrom.

9. In a vehicle, a motor, rear wheels and a front wheel means, a rear differential having an input shaft driven from the motor and output shafts respectively driving the rear wheels, a rotatable countershaft, means transmitting rotation from the countershaft to the front wheel means, a pair of members on said countershaft for rotation relative thereto, means transmitting rotation from each of said output shafts to a related one of said members, a first set of overrunning clutch teeth rotatable with each member, and two second sets of overrunning clutch teeth rotatable with said countershaft and respectively cooperating with said first sets of teeth, said teeth being so relatively disposed that each cooperating pair of sets of clutch teeth will transmit torque from one of said members to the countershaft if the member is rotating at a higher speed than the countershaft but will overrun idly if the member is rotating at a lower speed than the countershaft.

10. In a vehicle, a motor, rear wheels and a front wheel means, a rear differential having an input shaft driven from the motor and output shafts respectively driving the rear wheels, a rotatable countershaft, means transmitting rotation from the countershaft to the front wheel means, a pair of spaced members mounted on the countershaft for rotation relative thereto, means transmitting rotation from each of the output shafts to a related one of said members, a first set of overrunning clutch teeth rotatable with each member, and second sets of overrunning clutch teeth rotatable with said countershaft and respectively cooperating with said first sets of teeth, yielding means mounting at least one of the sets of teeth in each cooperating pair for slight axial displacement toward and away from the other set, the relative arrangement of said clutch teeth being such that torque will be transmitted to the countershaft from that member which is rotating faster than it.

11. In a vehicle, a motor, rear wheels and a front wheel means, a rear differential having an input shaft, mechanism including reverser means movable to a forward and a reverse position for selectively transmitting movement from the motor to said input shaft in a forward and a reverse direction respectively, and output shafts from said differential respectively driving said rear wheels, a rotatable countershaft, means transmitting rotation from the countershaft to the front wheel means, a pair of members mounted on the countershaft for rotation relative thereto, means transmitting rotation from each of the output shafts to a related one of said members, each member having a first forward set and a first reverse set of overrunning clutch teeth secured for rotation therewith, a selector assembly mounted on the countershaft for rotation therewith and axial displacement relative thereto, said assembly comprising two selector elements, each element having a second forward set and a second reverse set of overrunning clutch teeth rotatable therewith, said assembly being bodily displaceable as a unit between a forward position in which each second forward set is in cooperative engagement with a related first forward set of teeth, and a reverse position in which each second reverse set is in cooperative engagement with a related first reverse set of teeth, yielding means providing for a small amount of relative axial displacement between said elements, the relative orientation of the teeth in the respective sets being such that torque will be transmitted to the countershaft from the particular member rotating faster than it through said cooperating forward sets of teeth when the assembly is moved to its forward position and through said cooperating reverse sets of teeth when the assembly is moved to its reverse position, and means for selectively moving said assembly to its foward and to its reverse position according as whether movement is transmitted to said input shaft in the forward and in the reverse sense, whereby during a turn of the vehicle both in forward and reverse movement thereof the front wheel means will be driven from the particular rear output shaft located outward of the turn.

12. In the combination of parts claimed in claim 11, means connecting said reverser means to said selector assembly and adapted to move the assembly to its forward position when the reverser means is moved to its forward position, and to its reverse position when the reverser means is moved to its reverse position.

13. In the combination of parts claimed in claim 11, a manually displaceable member connected to said reverser means to move the latter means to either selected one of its forward and its reverse positions, and means displaceable with the manual member and connected to the selector assembly for moving the assembly to a corresponding one of its forward and reverse positions.

14. In a vehicle, a motor, rear wheels and a front wheel means, a rear differential having an input shaft, mechanism including reverser means movable to a forward and a reverse position for selectively transmitting movement from the motor to the input shaft in a forward and a reverse direction respectively, and output shafts from said differential respectively driving said rear wheels, a rotatable countershaft, means transmitting rotation from the countershaft to the front wheel means, a pair of members mounted on the countershaft for rotation relative thereto, means transmitting rotation from each of the output shafts to a related one of said members, each member having a first forward set and a first reverse set of overrunning clutch teeth secured for rotation therewith, a selector assembly mounted on the countershaft for rotation therewith and axial displacement relative thereto, said assembly comprising two selector elements, each element having a second forward set and a second reverse set of overrunning clutch teeth rotatable therewith, and an operative connection from said reverser means to said assembly whereby with the reverser means moved to its forward position the assembly is moved to a forward position in which each second forward set of teeth is in cooperative engagement with a related first forward set of teeth, and with the reverser means moved to its reverser position the assembly is moved to a reverse position in which each second reverse set of teeth is in cooperative engagement with a related first reverse set of teeth, said connection including yielding means supporting each selector element for slight axial displacement along said countershaft relative to the other element, the relative orientation of teeth in the respective sets being such that torque will be transmitted to the countershaft from the member rotating faster than it in either position of said reverser means, whereby during a turn of the vehicle both during forward and reverse movement thereof the front wheel means will be driven from the rear output shaft located outward of the turn.

15. The combination of parts claimed in claim 14, wherein said connection includes a lever connected with said reverser means for displacement thereby between two positions, a pair of parallel spaced resilient arms having their one ends pivoted on fixed pivots and their other ends connected to said lever for parallel angular displacement of said arms about said pivots on displacement of said lever between said positions, each arm being adapted to flex slightly between its ends towards and away from the other arm, and means respectively connecting said arms at intermediate points thereof to said selector elements, whereby displacement of said reverser means between its said positions will effect an angular displacement of said resilient arms about said pivots to shift the selector elements bodily between said positions thereof, while the resilient flexing of either arm will allow overrunning operation of a set of clutch teeth associated with the element connected to said arm.

16. In a vehicle, a frame, front and rear driving wheels, a support pivotally mounted in said frame for said front wheel, a rear differential having a power driven input shaft and output shafts driving said rear wheels, a rotary driving member adjacent said front wheel support, means for selectively connecting one of the output shafts of the differential to said rotary driving member, and means for driving the front wheel comprising a jointed drive having end shafts one of which is connected to the front wheel and the other to said rotary driving member, said shafts being journalled respectively in said support and frame.

References Cited in the file of this patent
UNITED STATES PATENTS

| | | |
|---|---|---|
| 656,491 | Valentine | Aug. 21, 1900 |
| 1,392,149 | Guthrie | Sept. 27, 1921 |
| 1,606,707 | Johnston et al. | Nov. 9, 1926 |
| 1,812,801 | Nus | June 30, 1931 |

FOREIGN PATENTS

| | | |
|---|---|---|
| 359,410 | Germany | Oct. 24, 1922 |